Dec. 4, 1928. 1,693,738
T. C. WHITEHEAD
OIL EXTRACTOR
Filed July 23, 1923
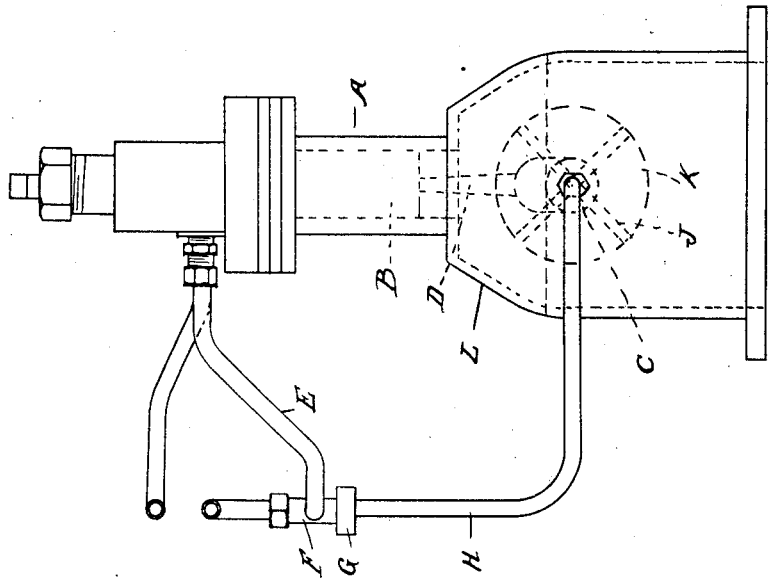
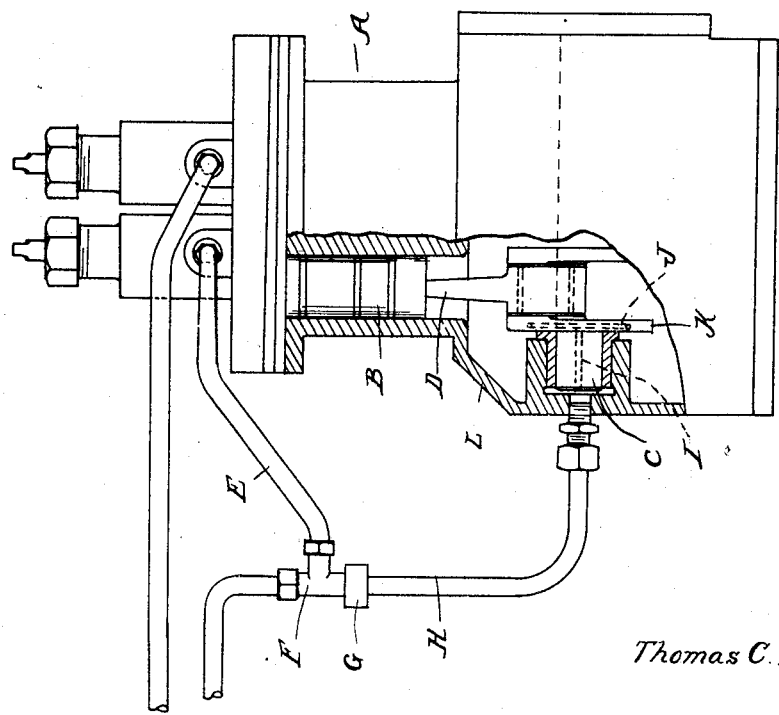
Inventor
Thomas C. Whitehead
Attorneys Patented Dec. 4, 1928.

1,693,738

UNITED STATES PATENT OFFICE.

THOMAS C. WHITEHEAD, OF DETROIT, MICHIGAN.

OIL EXTRACTOR.

Application filed July 23, 1923. Serial No. 653,235.

The invention relates to oil extractors more particularly designed for separating the oil from a gaseous stream such as delivered from a gas compressor. To this end the invention consists in the construction as hereinafter set forth.

In the drawings:

Figure 1 is a sectional elevation of a gas compressor showing my improved extractor applied thereto;

Figure 2 is an end elevation thereof.

A is a pump designed for use as a gas compressor and which as shown is provided with cylinders having reciprocatory pistons B therein. C is a crank shaft for reciprocating the pistons through the connecting pitman rods D.

Where such a pump is used for compressing gas, the lubricant which is used for the cylinders and pistons will find its way about the latter and more or less of this lubricant will be picked up by the gaseous stream discharged from the compressor. The same effect will be produced by other types of pump, as where the parts of the mechanism are lubricated.

To extract the lubricant from the gaseous stream, I utilize the rotor of the pump for forming a centrifugal oil pump and also provide baffling means for separating the lubricant from the gas and then drawing it backward into the crank case by said centrifugal pump.

In detail, E is the discharge conduit from the pump, which extends to a fitting F for abruptly changing the direction of flow. At the bottom of the fitting F is a drainage well G which is connected by a conduit H with the end of the crank shaft C. This crank shaft has a passage I extending centrally through the end portion thereof and communicating with one or more radially extending passages J which are formed in the cheek plate K of the crank. The arrangement is such that when the crank shaft is rapidly revolving, centrifugal action will throw outward any lubricant collecting in the passages I and J. This will produce a suction which is communicated through the conduit H to the well G and therefore the lubricant which is thrown out of the gaseous stream at the sharp bend will be returned again to the crank case. As the crank case is a closed chamber, there is no tendency for the compressed gas to escape, inasmuch as the pressure within said chamber will equal that on the line, but the liquid lubricant will be returned as has been described.

The crank shaft C is enclosed in a tight crank case L, which is partly filled with lubricant distributed to the cylinders by the splash of the cranks. The level of the lubricant is, however, below the top of the cheek plate K and by having several radial passages in said cheek plate, at least one will always remain unsealed. This prevents the forcing of the lubricant backward through the conduit H when the pump is not in operation.

What I claim as my invention is:

1. The combination with a gas pump comprising a crank shaft, and a casing for said shaft, said casing further forming a lubricant container, a gas conduit for the gas compressed by the pump, means connected to said conduit for collecting lubricant carried in suspension by said gas, a conduit leading from said collecting means into said casing, and a centrifugal thrower arranged within said casing upon said crank shaft and formed with a plurality of radial passages communicating substantially axially of said shaft with said conduit, said passages being arranged to locate the outlet of at least one thereof always above the normal lubricant level in the crank case.

2. In combination, a gas pump, a gas conduit for the gas compressed by the pump, means connected to said conduit for collecting lubricant carried in suspension by said gas, a lubricant conduit leading from said collecting means, and a rotatable disc having a plurality of radial passages communicating with the said lubricant conduit, the said passages being adapted upon rotation of the disc to function as a centrifugal pump for withdrawing the lubricant from said collecting means through the said lubricant conduit.

In testimony whereof I affix my signature.

THOMAS C. WHITEHEAD.